(12) United States Patent
Pegg

(10) Patent No.: US 7,831,148 B2
(45) Date of Patent: Nov. 9, 2010

(54) OPTICAL NETWORK AND AMPLIFIER NODE THEREFORE

(75) Inventor: Steven Ian Pegg, Northamptonshire (GB)

(73) Assignee: Ericsson AB, Stockholm (SE)

( * ) Notice: Subject to any disclaimer, the term of this patent is extended or adjusted under 35 U.S.C. 154(b) by 779 days.

(21) Appl. No.: 10/576,640

(22) PCT Filed: Oct. 22, 2004

(86) PCT No.: PCT/EP2004/052641

§ 371 (c)(1),
(2), (4) Date: Dec. 26, 2006

(87) PCT Pub. No.: WO2005/041451

PCT Pub. Date: May 6, 2005

(65) Prior Publication Data

US 2007/0274723 A1    Nov. 29, 2007

(30) Foreign Application Priority Data

Oct. 25, 2003  (DE) ................. 103 49 891

(51) Int. Cl.
*H04J 14/02* (2006.01)
(52) U.S. Cl. .............. 398/83; 398/81; 398/82; 398/84; 398/87
(58) Field of Classification Search ........... 398/79, 398/81–87
See application file for complete search history.

(56) References Cited

U.S. PATENT DOCUMENTS 5,798,855 A    8/1998   Alexander et al.

(Continued)

FOREIGN PATENT DOCUMENTS

DE    19831801 A1    4/1999

(Continued)

OTHER PUBLICATIONS

Lee J H et al. "Passive Erbium-Doped Fiber Seed Photon Generator for High-Power Er3+-doped Fiber Flourescent Sources with an 80-nm Bandwidth." Optics Letters, Optical Society of America, Washington, US, vol. 24, No. 5, Mar. 1, 1999, pp. 279-281, XP000823516. ISSN: 0146-9592.

*Primary Examiner*—Ken N Vanderpuye
*Assistant Examiner*—Hibret A Woldekidan
(74) *Attorney, Agent, or Firm*—Coats & Bennett, P.L.L.C.

(57) ABSTRACT

An optical network comprises a transmitter node (1), a receiver node (4) and an optical fiber (3) for transmitting an optical wavelength-division multiplex signal having payload channels and a supervisory channel between the nodes (1, 4). At least one of the nodes has an amplifier (8, 13) which is passed by the multiplex signal. The transmitter node (1) has a source (11) for the supervisory channel and a multiplexer (12) for combining the payload channels and the supervisory channel in order to form the optical wavelength-division multiplex signal, and the receiver node (4) has a sink (16) for the supervisory channel and a demultiplexer (14) for separating the wavelength division multiplex signal into supervisory and the payload channels. The multiplexer (12) and the demultiplexer (14) are adapted to insert and extract, respectively, as the supervisory channel, a wavelength into/from the optical multiplex signal, the attenuation of which between source (11) and sink (16) is essentially the same in the pumped and unpumped states of the amplifier (8, 13).

10 Claims, 3 Drawing Sheets

U.S. PATENT DOCUMENTS

| | | |
|---|---|---|
| 6,057,959 A | 5/2000 | Taylor et al. |
| 6,271,962 B1 | 8/2001 | Choi |
| 6,292,289 B1 * | 9/2001 | Sugaya et al. ............... 359/337 |
| 6,301,404 B1 * | 10/2001 | Yoneyama ................... 385/24 |
| 6,381,049 B1 * | 4/2002 | Xu et al. ....................... 398/82 |
| 6,411,407 B1 | 6/2002 | Maxham |
| 6,623,185 B1 * | 9/2003 | Peragine ..................... 398/26 |
| 6,885,824 B1 * | 4/2005 | Zhang et al. ................. 398/83 |
| 6,891,607 B2 * | 5/2005 | Bisson et al. ............. 356/73.1 |
| 2002/0110318 A1 | 8/2002 | Wu et al. |
| 2003/0106990 A1 * | 6/2003 | Tomofuji et al. ...... 250/214 LA |
| 2006/0228111 A1 | 10/2006 | Pegg |

FOREIGN PATENT DOCUMENTS

| | | |
|---|---|---|
| EP | 0762569 | 3/1997 |
| EP | 1156607 | 11/2001 |
| EP | 1164811 | 12/2001 |
| WO | WO 02/091027 | 11/2002 |

\* cited by examiner

OPTICAL NETWORK AND AMPLIFIER NODE THEREFORE

BACKGROUND

The present invention relates to an optical network for telecommunication and an amplifier node which may be used in such a network. More particularly, it relates to a network and a network node for wavelength division multiplex transmission.

Such an optical network is generally formed of a plurality of nodes which are interconnected by optical fibres on which communication signals are transmitted as a wavelength division multiplex, i.e. modulated onto a plurality of carrier waves of different wavelengths which propagate simultaneously in the fibre.

Due to the attenuation of the carrier waves, communication signals that are to be transmitted over wide distances must be re-amplified at regular intervals. This reamplification may be done in nodes which are specifically provided for this purpose between two fibre sections, but the nodes may also interconnect a larger number of fibre sections and accomplish a switching function, i.e. they may separate an incoming wavelength division multiplex into its payload channels corresponding to different carrier wavelengths and forward these to various outgoing fibre sections.

The present invention relates to amplifier nodes of both types.

It is common to transmit on an optical fibre not only the payload channels, i.e. the carrier waves which convey payload data between terminals of the network, but also a so-called optical supervisory channel OSC, which conveys information required for controlling the payload channels and the information conveyed in them within the nodes of the communication network.

The information transmitted on the supervisory channel is purely internal information of the network which is not transmitted to terminals connected to the network and which may therefore use other transmission formats than the payload channels and is processed independently from the pay-load channels in the nodes of the network.

In most conventional networks for wavelength division multiplex transmission, a demultiplexer for demultiplexing the incoming wavelength division multiplex into the payload channels and a supervisory channel is provided immediately at the entry port of the node. The processing of the payload data channels and of the supervisory channel within the node is carried out completely separately from one another before reaching a multiplexer immediately before the exit port of the network node. The multiplexer reassembles the payload data channels and the supervisory channel into a wavelength division multiplex.

A disadvantage of this conventional design is that insertion losses caused by the use of the demultiplexer and the multiplexer attenuate the incoming wavelength multiplex at the location of its transmission path where it is weakest and, respectively, attenuate it even before it enters the transmission fibre. In order to compensate the insertion losses and to have sufficient signal power for further processing at the output of the demultiplexer, it would be conceivable to increase the transmission power fed into the optical fibre. However, this fails in most cases, because most networks already use so high a transmission power that a further increase would cause a significant increase of non-linear effects, which deteriorate the signals. The only possibility is, therefore, to reduce the distance between two amplifier nodes.

In U.S. Pat. No. 6,411,407, an amplifier node and an optical network, respectively, according to the pre-characterizing portions of the independent claims are proposed. In these amplifier nodes, there is provided a pre-amplifier between the entry port and the demultiplexer, and a post-amplifier between the multiplexer and the exit port, respectively, which overcompensate the insertion losses of the demultiplexer and the multiplexer. The carrier wavelengths of the payload data channels are distributed in a wavelength range of 1530 to 1560 nm, which is common in this field of technology, and which corresponds to that wavelength range in which the amplification of an erbium-doped fibre amplifier is independent of the wavelength. The supervisory channels are placed outside of this wavelength range, at wavelengths where the erbium-doped fibre amplifier has less amplification or no amplification at all. A supervisory channel which is branched off in the demultiplexer after passing through the pre-amplifier is terminated in the node and is generated anew at the exit side thereof, is combined with the outgoing payload channels in the multiplexer, passes a post-amplifier together with these and is transmitted on an outgoing optical fibre. With the use of the pre-amplifier it is possible to feed an incoming wavelength division multiplex into the demultiplexer at sufficient power so that at the output side thereof, sufficient signal power for further processing is available, and due to the placement of the post-amplifier behind the multiplexer, the output power of the post-amplifier is available without loss for feeding into the outgoing fibre, but for this, a decrease of reliability has to be accepted. If one of the two amplifiers at the beginning and the end of a transmission fibre fails, this not only prevents transmission of the payload channels, but also the available power of the supervisory channel at the receiver node decreases, so that it can no longer be reliably processed, whereby the detection of the failure and its causes as well as the repair thereof is made considerably more difficult, if not impossible.

SUMMARY

The object of the present invention is to provide a solution to this problem.

The solution of the invention is in the judicious choice of a wavelength for the supervisory channel.

Considering the receiver side of an amplifier node, the wavelength which is branched off the wavelength division multiplex by the demultiplexer as the supervisory channel should be selected such that its attenuation between the entry port and the sink receiving the supervisory channel is essentially the same in the pumped and unpumped states of the amplifier.

Considering the output side of such an amplifier node, a criterion for the wavelength of the supervisory channel is that the attenuation between the source of the supervisory channel and the exit port should be essentially the same in the pumped and unpumped states of the amplifier.

This wavelength may slightly differ from the wavelength at which the attenuation of the amplifier alone is the same in the pumped and unpumped states, since on the optical path between the entry port and the sink or between the source and exit port components with wavelength-dependent attenuation such as curved waveguides might be present. If the design of transmitter and receiver sides of the network nodes is sufficiently symmetrical, the two above criteria for the wavelength of the supervisory channel are equivalent.

If not only the isolated amplifier node is considered, but, instead, a complete network in which a transmitter node and an amplifier node are connected by an optical fibre, this fibre may also have a wavelength-dependent attenuation which influences the optimum wavelength for the supervisory channel. In this case, the wavelength for the supervisory channel should be selected such that a total attenuation experienced by the supervisory channel on the way from a source to a sink is independent of whether an amplifier located along its path is pumped or unpumped.

If the amplifier is an erbium-doped fibre amplifier, the wavelength of the supervisory channel is preferably selected between 1600 and 1650 nm, in particular between 1610 and 1650 nm.

In order make the bandwidth that may be used for the payload data channels of the wavelength division multiplex broader than the range in which the amplification by an active medium of the amplifier by itself is essentially independent of the wavelength, a gain-equalizing filter may be serially combined with the active medium. This filter must then also be transparent at the wavelength of the supervisory channel so as not to suppress it.

Further features and advantages of the invention become apparent from the subsequent description of an embodiment referring to the appended Figures.

DETAILED DESCRIPTION

Figure 1A:
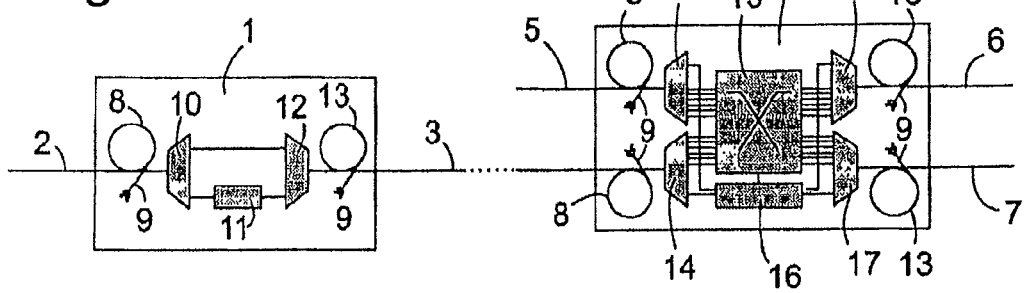
FIG. 1A schematically shows a section of an optical network having two amplifier nodes and an optical fibre connecting these amplifier nodes, in which the invention is applicable.

FIG. 1A schematically shows a section of a network comprising a network node 1 exclusively functioning as an amplifier, which amplifies a wavelength division multiplex signal arriving by an optical fibre 2 and attenuated on fibre 2 and outputs it to a further optical fibre 3, and a network node 4 which, in addition to the amplifier function, also carries out a switching function and therefore receives an optical wavelength-division multiplex signal not only from optical fibre 3 but from at least one other fibre 5 and outputs it to fibres 6, 7.

In the description, only the case of uni-directional transmission, from left to right in the Figure, is considered, but it is understood that by duplicating the corresponding devices of network nodes 1, 4, bi-directional transmission is also possible.

The wavelength-division multiplex signals circulating on the optical fibres 2, 3, 5, 6, 7 are formed of a plurality of payload data channels in a wavelength range of approximately 1530 to 1560 nm and an optical supervisory channel at a wavelength of at least 1600 nm.

In the network node 1, a wavelength-division multiplex signal, which reaches network node 1 via fibre 2, first passes a pre-amplifier 8.

Figure 1B:
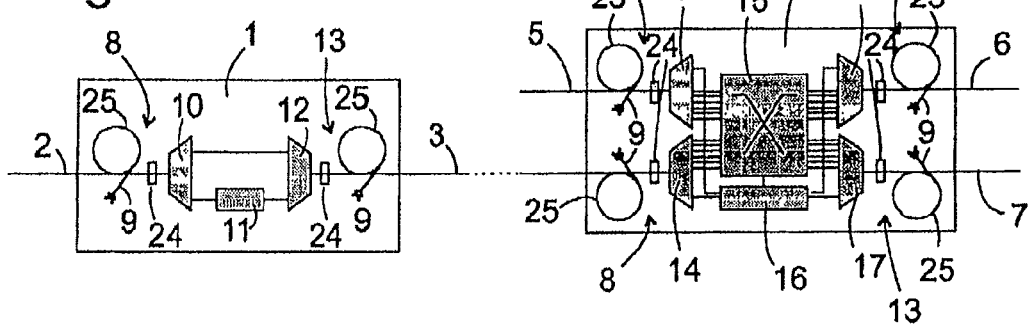
FIG. 1B is a variant of the section of FIG. 1A.

This pre-amplifier 8 may be realized as an erbium-doped fibre which is pumped by a pump light source 9 such as a diode laser, in order amplify the wavelength-division multiplex signal in wavelength range of approximately 1527 to 1565 nm. Additionally, the amplifier may comprise, as shown in FIG. 1B, a gain-equalizing filter 24, which is mounted downstream of the erbium-doped fibre 25. A gain-equalizing filter, which is specific for a certain active laser medium such as the erbium-doped fibre, has a transmission characteristic which is inverse to the wavelength-amplification characteristic of the active medium, with a transmission minimum at the amplification maximum of the active medium and absorption minima outside the wavelength band in which the wavelength dependence of the gain of the active medium is inherently small. Thus, the overall wavelength-gain characteristic of the entire pre-amplifier 8 has a band with little wavelength dependence, which is broader than that of the active medium alone and is therefore capable of conveying more payload channels. The gain-equalizing filter is transparent at the wavelength of the supervisory channel. Preferably, it has an absorption minimum at this wavelength, too.

The thus pre-amplified wavelength-division multiplex signal passes a demultiplexer 10 in which the optical supervisory channel, which passes the pre-amplifier 8 without being amplified therein and also without substantially being attenuated therein, is branched off the payload channels in order to lead it through an amplifier 11 which is adapted to its wavelength. The payload channels are guided from the demultiplexer 10 straight to a multiplexer 12 in which they are recombined with the optical supervisory channel amplified in amplifier 11. The multiplex signal, which is now complete again, passes a post-amplifier 13. This amplifier, too, may be formed according to FIG. 1A by a simple erbium-doped fibre as the active medium, pumped by a pump light source 9, or according to FIG. 1B with a gain-equalizing filter 24 as described above for the pre-amplifier 8. In the case of the post-amplifier, the gain-equalizing filter 24 is located upstream of the active medium, that is, the fibre 25, to achieve the highest possible output power of the post-amplifier 13 without saturating the active medium.

After passing through the post-amplifier 13, the wavelength multiplex is output on the optical fibre 3 leading to the network node 4.

At the network node 4, a pre-amplifier 8 and, downstream thereof, a demultiplexer 14 are located at each entry port for a fibre 3, 5. While the demultiplexer 10 of the node 1 only has to demultiplex the wavelength division multiplex into two components—the payload channels and the supervisory channel—the de-multiplexers 14 also separate the individual payload channels from one another and supply them individually to a switching fabric 15. The supervisory channels branched off at the demultiplexer 14 are terminated at a control unit 16 which controls connections switched between inputs and outputs of the switching fabric 15. Further, the control unit 16 generates new supervisory channels, which are combined with the payload channels switched in the switching fabric 15 in multiplexers 17 so as to form new wavelength-division multiplex signals. These pass the post-amplifiers 13 and are output on fibres 6, 7.

Figure 2:
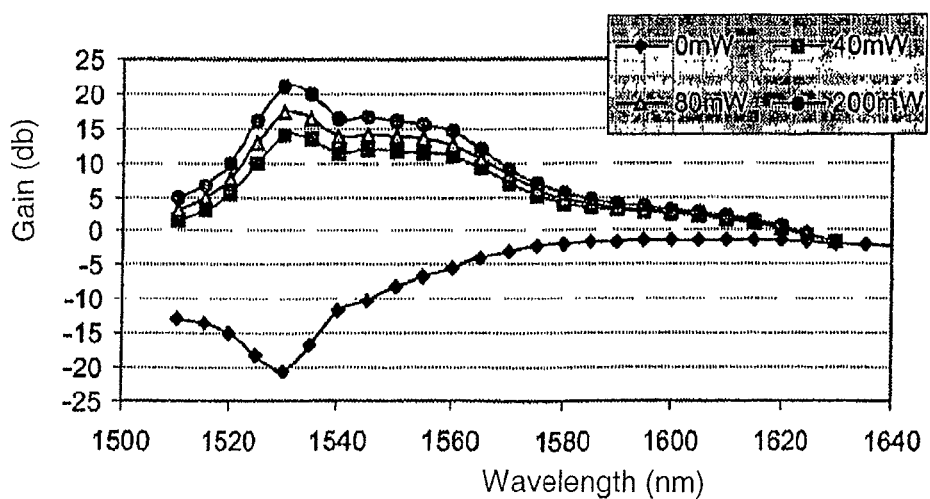
FIG. 2 shows the attenuation and amplification, respectively, of an erbium-doped fibre amplifier as a function of the wavelength for different values of pump powers.

FIG. 2 illustrates the gain of a typical erbium-doped fibre amplifier without gain-equalizing filter as a function of the wavelength to be amplified at pump powers of 0 mW, 40 mW, 80 mW and 200 mW. The gain curves for positive pump powers exhibit a plateau between 1530 and 1560 nm, which corresponds to the band used for transmission of the payload channels. Above and below this band, there are wavelength regions in which the amplification is less but still substantially positive. In these wavelength ranges the amplifier fibre also has a non-negligible absorption if the pump power is 0, i.e. if the pump light source 9 of the amplifier fails.

Figure 3:
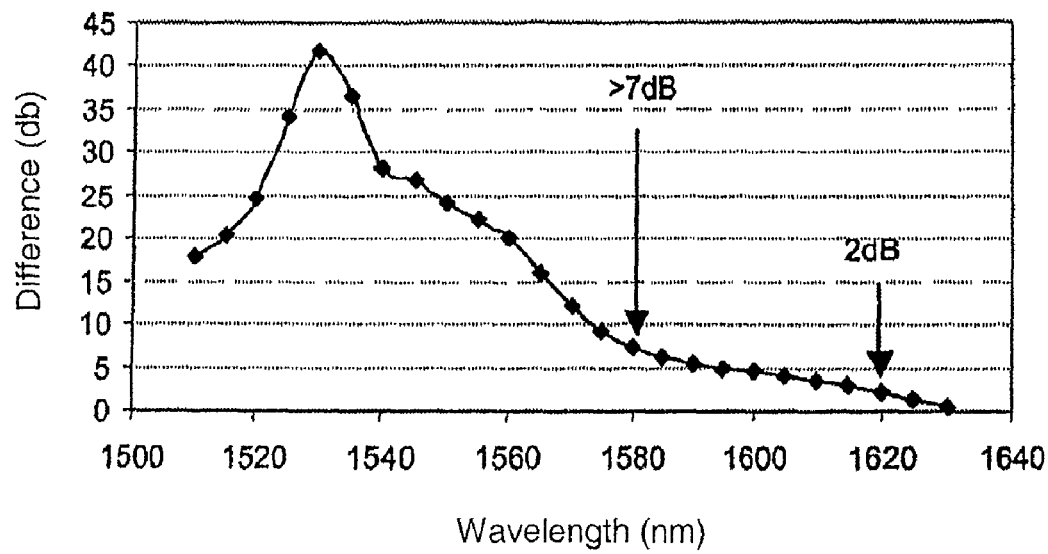
FIG. 3 illustrates the relation between the output powers of the amplifier in the pumped and unpumped states as a function of the wavelength.

FIG. 3 shows the difference between the gain levels of the amplifier at full pump power and at 0 pump power as a function of the wavelength. At a wavelength of e.g. 1580 nm, which is far outside the frequency range used for the payload channels, this difference is still 7.3 dB. At 1615 nm, it is already below 3 dB, and at 1620 nm it is approx. 2 dB. Only from approx. 1630 nm onwards, there is practically no difference. At first sight, one might think that in order to make the power level of the supervisory channel independent of the operation of the amplifiers 8 or 13, one would have to choose a wavelength of at least 1630 nm for the supervisory channel. However, it must be considered that the transmission of the employed optical materials is wavelength dependent, and that curvatures of the waveguides in which the multiplex signal propagates cause the higher an attenuation, the longer the wavelength is. Therefore, the intrinsic attenuation experienced by the supervisory channel within a network node on its way from the entry port thereof to a sink, which may be the input of the amplifier 11 or of the control unit 16, or from a source, i.e. the output of amplifier 11 or control unit 16 to the exit of the network node, or between source and sink of network nodes connected by an optical fibre such as fibre 3, is the stronger, the longer the wavelength is. In order to take account of this influence and to make the power of the optical supervisory channel at the sink or at an output port of a network node 1 or 4 really independent of the operation state of the amplifiers 8 and 13, respectively, for the presently available optical components the wavelength of the supervisory channel must be chosen in a range where the dependence of the gain in the amplifiers from the pumping state is small but not yet exactly 0. Obviously, such a wavelength is dependent on the design of the network nodes and the materials used therein, and, eventually, on the material of the optical fibre. Here, wavelengths from 1600 nm, in particular in the range of 1610 to 1650 nm and in particular 1620 to 1630 nm have proven appropriate. If a gain-equalizing filter is used, eventually in combination with other active media, other limit wavelengths may prove appropriate.

Figure 4:
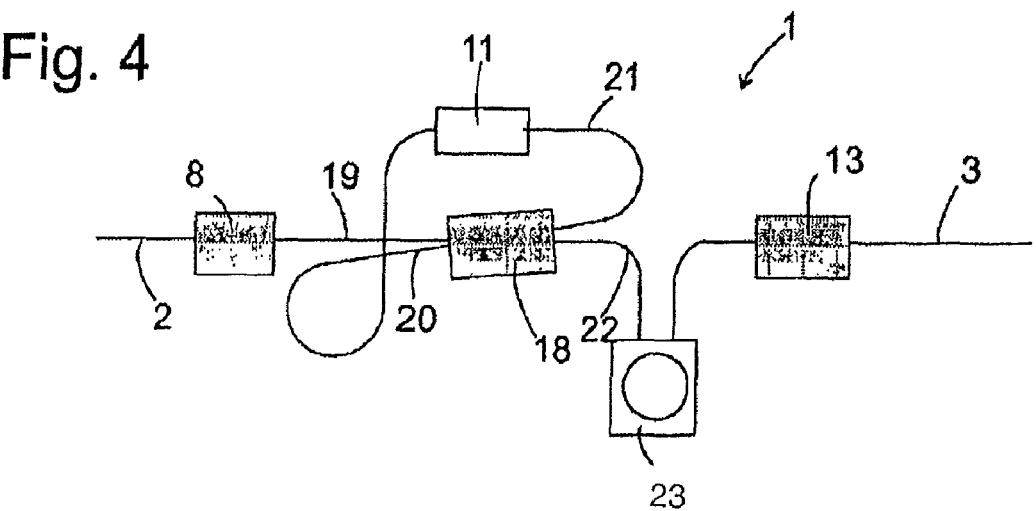
FIG. 4 shows a preferred embodiment of a network node.
Figure 5:
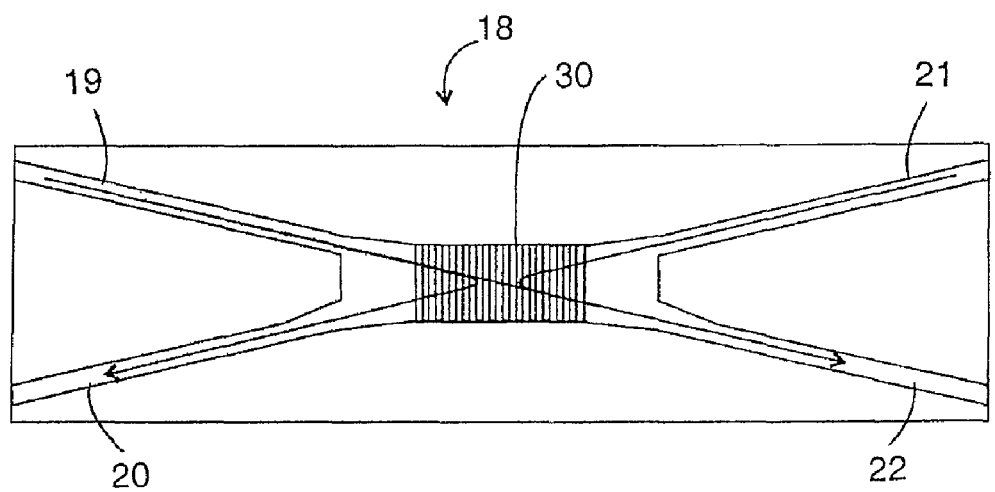
FIG. 5 illustrates a continuous, wavelength-selectively reflective structure according to one embodiment of the present invention.

FIG. 4 is a block diagram showing the structure of an alternative design of a network node 1 that functions exclusively as an amplifier. The demultiplexer 10 and multiplexer 12 of FIG. 1 are here merged into a continuous, wavelength-selectively reflecting structure 18 having four gates, which receives the incoming wavelength-division multiplex signal at a first gate 19 from the pre-amplifier 8, outputs its optical supervisory channel at a second gate 20 to the amplifier 11, receives the amplified supervisory channel at the third gate 21 and outputs it, recombined with the payload channels, at a fourth gate 22 via a dispersion compensator 23 to the post-amplifier 13. Such a four-gate structure 18 (seen in FIG. 5) may easily be formed, for example, by an optical integrated Bragg grating, the grating constant of which is selected so as to reflect the supervisory channel and to transmit the payload channels.

The invention claimed is:

1. An amplifier node for an optical network comprising:
   at least one input port receiving an incoming optical wavelength-multiplex signal;
   a pre-amplifier receiving the incoming optical wavelength-multiplex signal;
   a demultiplexer and a multiplexer merged into a single continuous, wavelength-selectively reflective structure configured to perform both demultiplexing and multiplexing functions, wherein the demultiplexer is configured to split the amplified incoming optical wavelength-multiplex signal at least into payload channels and a supervisory channel, and the multiplexer is configured to assemble the payload channels and the supervisory channel into an outgoing optical wavelength-multiplex signal, the continuous, wavelength-selectively reflective structure including:
      a first gate receiving the incoming wavelength-multiplex signal from the pre-amplifier,
      a second gate outputting the supervisory channel to an amplifier,
      a third gate receiving the supervisory channel from the amplifier, and
      a fourth gate outputting the outgoing optical wavelength-multiplex signal;
   a dispersion compensator receiving the outgoing optical wavelength-multiplex signal; and
   a post-amplifier receiving a dispersion compensated outgoing optical wavelength-multiplex signal and transmitting an amplified dispersion compensated outgoing optical wavelength-multiplex signal;
   wherein the continuous, wavelength-selectively reflective structure is adapted to split off and to insert as the supervisory channel a wavelength, the attenuation of which between the input port and the amplifier is substantially the same in a pumped state and an unpumped state of the pre-amplifier and post-amplifier.

2. The amplifier node of claim 1 wherein the amplifier comprises an erbium-doped fiber amplifier, and wherein the wavelength of the supervisory channel is between about 1600 and 1650 nm.

3. The amplifier node of claim 2 wherein the wavelength of the supervisory channel is between about 1610 and 1650 nm.

4. The amplifier node of claim 3 wherein the active medium is placed before the filter in the amplifier.

5. The amplifier node of claim 3, wherein the active medium is placed behind the filter in the amplifier.

6. The amplifier node of claim 1 wherein the amplifier comprises an active medium in series with a leveling filter to level a gain of the active medium in the wavelength band of the payload channels, and wherein the leveling filter is transparent for the supervisory channel.

7. An optical network, comprising:
   an optical fiber to transmit an optical wavelength-multiplex signal comprising payload channels and a supervisory channel;
   a transmitter node comprising:
      at least one input port receiving an incoming optical wavelength-multiplex signal;
      a pre-amplifier receiving the incoming optical wavelength-multiplex signal;
      a demultiplexer and a multiplexer merged into a single continuous, wavelength-selectively reflective structure configured to perform both demultiplexing and multiplexing functions, wherein the demultiplexer is configured to split the amplified incoming optical wavelength-multiplex signal at least into payload channels and a supervisory channel, and the multiplexer is configured to assemble the payload channels and the supervisory channel into an outgoing optical wavelength-multiplex signal, the continuous, wavelength-selectively reflective structure including
         a first gate receiving the incoming wavelength-multiplex signal from the pre-amplifier,
         a second gate outputting the supervisory channel to an amplifier,
         a third gate receiving the supervisory channel from the amplifier, and a fourth gate outputting the outgoing optical wavelength-multiplex signal;

a post-amplifier outputting the outgoing optical wavelength-multiplex signal onto the optical fiber; and a dispersion compensator interposed between the continuous, wavelength-selectively reflective structure and the post-amplifier; and a receiver node to receive the optical wavelength-multiplex signal from the transmitter node, the receiver node comprising:

a second demultiplexer configured to split the optical wavelength-multiplex signal into the supervisory channel and the payload channels; and a sink for the supervisory channel;

wherein the multiplexer and demultiplexer are adapted to insert and extract, respectively, as the supervisory channel, a wavelength into/from the optical wavelength-multiplex signal, the attenuation of which between the amplifier and the sink is substantially the same in pumped and unpumped states of the pre-amplifier and the post-amplifier.

8. The optical network of claim 7 wherein the amplifier comprises an erbium-doped fiber amplifier, and wherein the wavelength of the supervisory channel is between about 1600 and 1650 nm.

9. The optical network of claim 8 wherein the wavelength of the supervisory channel is between about 1610 and 1650 nm.

10. The optical network of claim 7 wherein the amplifier comprises an active medium in series with a leveling filter that levels the gains of the payload channels, and wherein the leveling filter is transparent to the supervisory channel.

* * * * *